Feb. 13, 1968  C. F. ALEXANDER, JR  3,368,420
MULTIPLE DRIVE SHAFTS
Filed Aug. 2, 1965  2 Sheets-Sheet 1
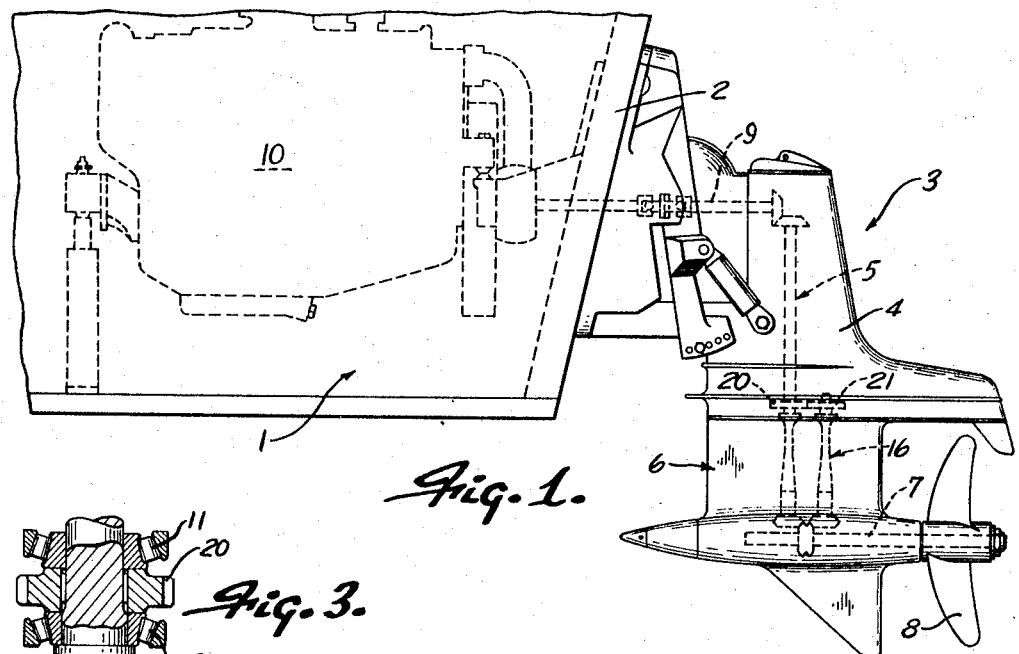
Fig. 1.
Fig. 3.
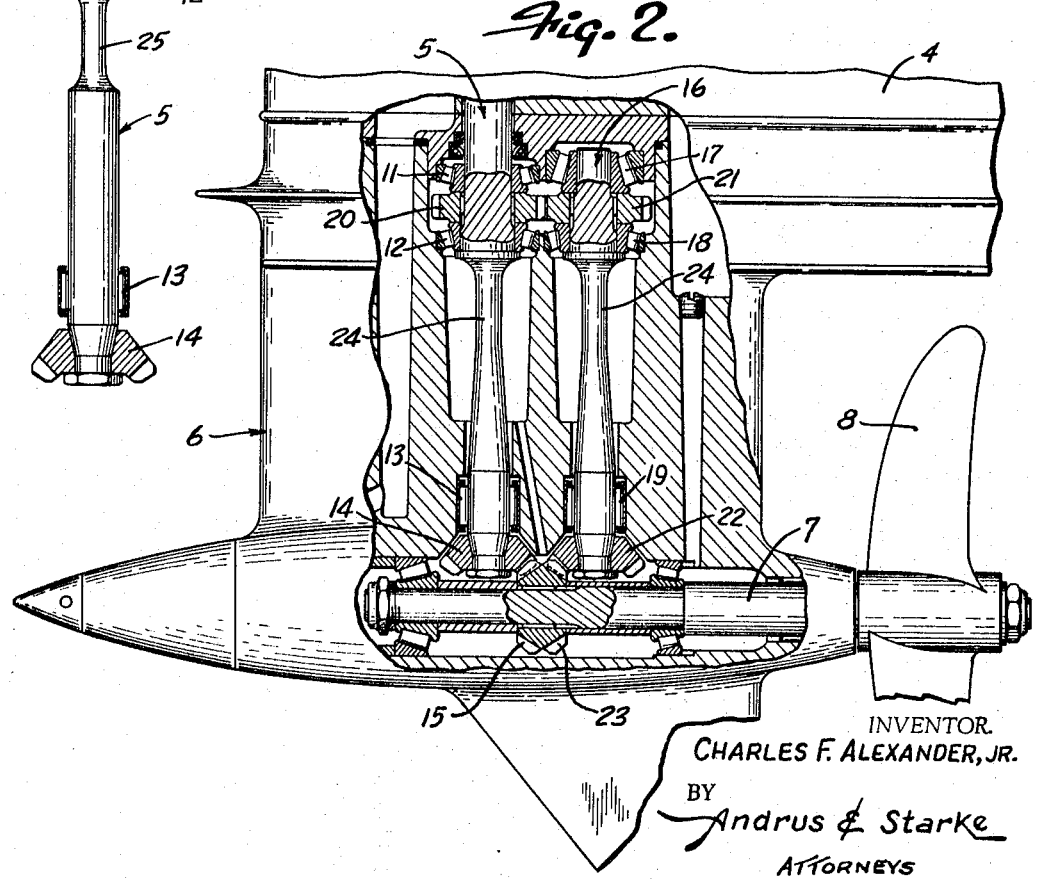
Fig. 2.
INVENTOR.
CHARLES F. ALEXANDER, JR.
BY Andrus & Starke
ATTORNEYS

United States Patent Office 3,368,420
Patented Feb. 13, 1968

3,368,420
MULTIPLE DRIVE SHAFTS
Charles F. Alexander, Jr., Oshkosh, Wis., assignor to Kiekhaefer Corporation, Fond du Lac, Wis., a corporation of Delaware
Filed Aug. 2, 1965, Ser. No. 476,320
5 Claims. (Cl. 74—410)

ABSTRACT OF THE DISCLOSURE

A parallel dual shaft drive has spaced bearings for the shafts with output beveled gears at one end of the shafts driving a common output member and with gears connecting the shafts at the opposite ends for power input from one shaft to the other, the bearings being disposed adjacent the gears. Both shafts have a torsional yielding section remote from the output end. The input gears are secured by spline teeth to their corresponding shafts, one gear having one less spline teeth than gear teeth and the other gear having one greater spline teeth than gear teeth to provide a differential adjustment to a minimum running clearance for the gears at no load.

---

This invention relates to an improvement in dual drive shafts for underwater propellers.

In such construction there are two parallel drive shafts connected together at their upper ends by spur gears which may be of the helical type, and connected by corresponding beveled gears at their lower ends to a propeller shaft. The construction of the drive shafts is such as to provide a predetermined torsional deflection under load, and which tends to equalize the load on each shaft.

It has been proposed heretofore to construct each of the drive shafts with an inner drive member extending downwardly from the corresponding spur gear and an outer tubular driven member extending upwardly from the corresponding bevel gear, and a spline connection between the two members. The inner drive member has a section of reduced diameter between the spur gear at the top and the spline connection at the bottom to provide the necessary torsional deflection under load, and thereby tending to equalize the loading of the two drive shafts. Each shaft member is supported by a bearing adjacent to the corresponding bevel gear thereon. In order to provide the necessary rigidity against lateral deflection of the overhung bevel gear the outer tubular member extends upwardly to a point above the reduced section of the inner member and is loosely splined to the inner member adjacent its bearing support.

The present invention is based upon the discovery that a much simpler and less costly shaft construction may be employed for the purpose and that it is possible to utilize a single shaft member supported by both an upper bearing near the upper spur gear and a lower bearing near the lower bevel gear.

In carrying out the invention the torsionally deflecting section of the shaft is provided by a portion of reduced diameter near the upper bearing and which leaves the major portion of the shaft extending downwardly and through the lower bearing, of substantial diameter. In other words the reduced diameter portion of each drive shaft is disposed at a substantial distance from the lower bearing.

The accompanying drawing illustrates the best mode presently contemplated for carrying out the invention.

In the drawing:

FIGURE 1 is a partial side elevation of a boat with an outboard stern drive generally having the present invention incorporated therein;

FIG. 2 is an enlarged detail side elevation of a portion of the drive with a portion of the housing broken away and parts sectioned;

FIG. 3 is a more detailed elevation of a modified shaft embodiment; and

Figure 4:
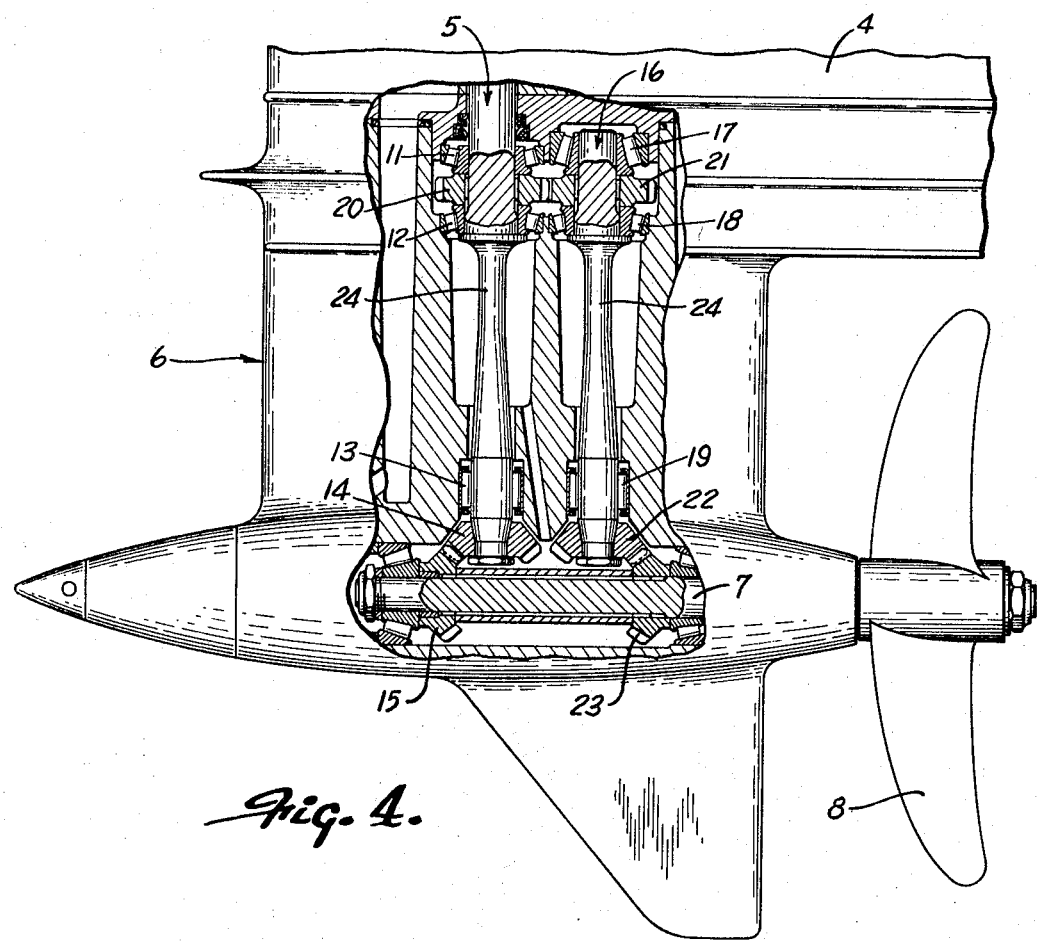
FIG. 4 is a view similar to FIG. 2 showing another embodiment in which the gears are arranged to drive the propeller in the opposite direction while maintaining the direction of rotation of the input shaft the same as for FIG. 2.

The invention is illustrated as applied to an outboard stern drive for boats, and is to be understood as similarly applicable to outboard motor drives and to other drives where substantially right angle beveled gears are employed.

The invention has particular advantage in driving underwater propellers since it enables keeping of the gear case small in frontal area for high horsepower drives that would otherwise require larger gears, a larger drive shaft, and larger bearing above the pinion with resulting larger frontal area. Smaller gear cases are are less resistant to forward motion of the unit through the water.

Referring to the drawing, the boat 1 has a rear transom 2 upon which is mounted an outboard stern drive 3.

The drive 3 comprises, in general a vertical drive shaft housing 4 containing the usual upper drive shaft 5, and an underwater unit 6 containing the usual horizontal propeller shaft 7 which extends rearwardly of the unit and carries the propeller 8 thereon.

The drive shaft 5 is driven at its upper end by any suitable means, such as the horizontal shaft 9 driven from an inboard motor 10. In the case of an outboard motor shaft 5 would be directly connected to the crankshaft of the engine.

The drive shaft 5 extends downwardly through the vertically spaced bearings 11, 12 and 13, respectively, and carries a bevel gear 14 at its lower end which meshes directly with a bevel gear 15 fixed on output shaft 7.

An auxiliary drive shaft 16 extends parallel to shaft 5 and is carried in bearings 17, 18 and 19, spaced generally corresponding to the spacing of bearings 11, 12 and 13.

The shafts 5 and 16 are connected at their upper ends by the spur gears 20 and 21 secured on the corresponding shafts between the corresponding bearings 11–12 and 17–18.

Shaft 16 carries a bevel gear 22 on its lower end and which meshes with a bevel gear 23 on output shaft 7.

Bevel gears 15 and 23 may be either integral and disposed back to back as shown in FIG. 2, or they may be separate and disposed to mesh with opposite sides of their corresponding drive gears 14 and 22, as shown in FIG. 4. For a given direction of rotation of the drive shaft 5, the propeller 8 is driven in one direction by the construction of FIG. 2, and in the opposite direction by the construction of FIG. 4.

The bearings 11 and 12 are preferably opposed thrust bearings, and are disposed on opposite sides of spur gear 20 closely adjacent thereto to support shaft 5 against lateral thrust from the spur gears. Likewise, bearings 17 and 18 are preferably opposed thrust bearings, and are disposed on opposite sides of spur gear 21 closely adjacent thereto to support shaft 16 against lateral thrust from the spur gears.

In carrying out the invention both shafts 5 and 16 are reduced in diameter in a relatively short region immediately beneath the corresponding bearings 12 and 18 to provide a section 24 of predetermined low torsional stiffness for each shaft. The remainder of shafts 5 and 16 extending downwardly to the corresponding lower bearings 13 and 19 is generally of larger diameter and may be of the full diameter of the shafts.

In the embodiment of FIGS. 1 and 2 each of the shafts 5 and 16 is constructed to taper upwardly to section 24 from a maximum diameter corresponding to that of the shafts to the reduced diameter of the section 24.

In the embodiment of FIG. 3 each shaft 5 and 16 has its full diameter throughout except for the short section 25 just below the corresponding bearing 12 and 18.

By retaining the shaft diameter for a distance substantially above the corresponding lower bearings 13 and 19, and disposing the sections 24 and 25 near to the corresponding bearings 12 and 18 which laterally support the same, lateral bending forces on the shafts arising from the corresponding bevel gears 14 and 22 are adequately resisted.

The invention provides a simple low cost construction that enables the shafts to torsionally deflect and thereby tend to maintain nearly equal loads thereon, and at the same time provides a support or mounting for the gears that resists cocking of the gears that would result in poor tooth contact and shorter gear life.

As explained in the previous application initial adjustment of the spur gears upon their respective shafts is important in equalizing the power transmission of the shafts.

In the practice of the present invention gears 20 and 21 may be constructed with seventeen teeth each, and gear 20 may be secured to its shaft 5 with sixteen spline teeth or keys, and gear 21 may be secured to its shaft 16 with eighteen spline teeth or keys. With this construction a differential action is obtainable in assembling the spur gears 20 and 21 upon their corresponding shafts.

For this purpose, in assembling the gears, the output shaft 7 is held against rotation and a light torque is applied to the upper ends of shaft 5 and 16 to load them lightly in the direction in which they are loaded in forward drive operation. The relative angular position of the two spur gears 20 and 21 is then adjusted until a predetermined small clearance appears between the driving faces of the meshing teeth thereon and the gears applied to the corresponding shafts in the adjusted relative positions.

If needed, an additional adjustment may be provided vertically between the spur gears 20 and 21 when the latter are of the helical gear type. For this purpose one or more shims may be placed under one of the gears to raise it relative to the other gear.

Thus a small free running clearance will be provided when rotated under conditions of no load. As the load is increased shaft 5 will gradually torsionally deflect to take up the clearance or back-lash in the gears and thereafter auxiliary shaft 16 will start to take a share of proportion of the load.

In an outboard drive for boats, such as that illustrated the increased load will result from an increase in engine speed so that as the engine is increased in speed the torgue transmitted by the two shafts 5 and 16 will tend to depend upon the relative torsional deflection of the shafts.

In general, where the torsional deflection characteristics of the two shafts are substantially the same, the difference in load arising from the initial torsional deflection of one of the shafts to take up the back-lash in the gears will remain substantially constant thereafter during driving of the propeller 8. The greater the angular deflection of the shafts under normal driving conditions and the smaller the angular deflection of one of the shafts necessary to account for the back-lash, the more nearly equal will be the load upon the shafts.

In order to take advantage of the nearly equal torque transmitted by shafts 5 and 16, it is possible to design the bevel gears 14 and 15 to transmit approximately one half the power, and the spur gear train 20–21 and bevel gear train 22–23 to transmit the other half of the power.

In a given system of power transmission, where the back-lash condition of the gears can be accurately controlled and predetermined in assembly, it would be possible to at least partially compensate for the initial torque deflection of one of the shafts to account for the back-lash, by providing a slightly higher resistance to torque deflection of the other shaft so that it will pick up load at a slightly faster rate than will the shaft which initially yields in response to back-lash conditions. With such a system it would be possible to equalize the torque load on the two shafts at a given speed and total load condition.

Various modes of carrying out the invention are contemplated as being within the scope of the following claims particularly pointing out and distinctly claiming the subject matter which is regarded as the invention.

I claim:

1. In a device of the class described, a plurality of parallel shafts connected to share in transmitting power from a single power source to a single output load, spaced bearings supporting each of said shafts for rotation, the output connection for each of said shafts comprising a bevel gear on the free end of the shaft and adjacent one of the supporting bearings therefor, and a torsionally deflecting section for each of said shafts comprising a reduced shaft portion between the bearings and nearer to the bearing farthest from the bevel gear.

2. In an outboard drive for boats having an underwater unit, a first substantially vertical integral drive shaft connected at its upper end to a power source, a substantially horizontal propeller shaft connected to the lower end of said drive shaft by a beveled gear train, a second integral power transmitting shaft disposed parallel to said drive shaft, a gear train at the upper end of said second shaft and connecting the same to said first shaft to receive power therefrom, a beveled gear train at the lower end of said second power transmitting shaft to drive said propeller shaft, a bearing supporting each of said power transmitting shafts immediately above the corresponding bevel gear train with a bevel gear of the gear train on the free end of the shaft, and a reduced portion of said first shaft disposed between said gear trains and constituting a torsionally yielding shaft portion remote from the corresponding bearing, said first and second shafts being disposed generally in the vertical plane of said propeller shaft and presenting a reduced frontal area for the underwater unit of said outboard drive for a given total torque transmission.

3. In an outboard drive for boats having an underwater unit, a first substantially vertical integral drive shaft connected at its upper end to a power source, a substantially horizontal propeller shaft connected to the lower end of said drive shaft by a beveled gear train, a second integral power transmitting shaft disposed parallel to said drive shaft, a gear train at the upper end of said second shaft and connecting the same to said first shaft to receive power therefrom, a beveled gear train at the lower end of said second shaft and connecting the same to said propeller shaft to drive the latter, a bearing supporting each of said power transmitting shafts immediately above the corresponding bevel gear train with a bevel gear of the gear train on the free end of the shaft, and a reduced portion for each of said first and second shafts between said gear trains to provide torsional deflection of said shafts under load and maintain nearly equal loading of said shafts, said first and second shafts being disposed generally in the vertical plane of said propeller shaft and presenting a reduced frontal area for the underwater unit of said outboard drive for a given total torque transmission.

4. In an outboard drive for boats having an underwater unit, a first substantially vertical drive shaft connected at its upper end to a power source, a substantially horizontal propeller shaft connected to the lower end of said drive shaft by a beveled gear train, a second power transmitting shaft disposed parallel to said drive shaft, a gear train at the upper end of said second shaft and connecting the same to said first shaft to receive power therefrom, a beveled gear train at the lower end of said second shaft and connecting the same to said propeller shaft to drive the latter, bearings supporting said first and second shafts adjacent said gear trains with a beveled gear of each said bevel gear train on the free end of the corresponding power transmitting shaft, and a reduced portion for each of said first and second shafts between said gear trains and generally remote from said output gear train to provide torsional deflection of said shafts under load and maintain nearly equal loading of said shafts, said first and second shafts being disposed generally in the vertical plane of said propeller shaft and presenting a reduced frontal area for the underwater unit of said outboard drive for a given total torque transmission.

5. In a device of the class described, a plurality of parallel shafts connected to share in transmitting power from a single power source to a single output load, gears interconnecting said shafts at the power input end thereof, gears on the output ends of said shafts separately connecting each shaft to a common output shaft, bearings for said shafts adjacent said first named gears and supporting said shafts against bending forces arising from the gears, a bearing adjacent each of said last named gears to support the corresponding shaft with the gear on a free end thereof and thereby applying bending forces to the shaft, and a torsionally deflecting reduced portion for each shaft disposed adjacent said first named gears and remote from said last named gears and comprising a tapered section extending substantially away from the last named bearing and toward the first named bearing.

References Cited

UNITED STATES PATENTS

| | | | |
|---|---|---|---|
| 1,040,443 | 10/1912 | Signor | 74—410 |
| 2,475,329 | 7/1949 | Leathers et al. | 74—409 X |
| 2,641,937 | 6/1953 | Erhardt et al. | 74—409 |
| 2,959,975 | 11/1960 | Lingel | 74—409 |
| 3,167,967 | 2/1965 | Silberger | 74—411 |
| 3,259,100 | 7/1966 | Kiekhaefer | 74—411 X |

OTHER REFERENCES

Metron Technical Data Sheet "Antibacklash Miniature Speed Changers" sheet No. 7, p. 1, November 1953.

ROBERT M. WALKER, *Primary Examiner.*

DONLEY J. STOCKING, *Examiner.*

J. R. BENEFIEL, *Assistant Examiner.*